United States Patent
Adsumilli et al.

(10) Patent No.: US 9,355,433 B1
(45) Date of Patent: May 31, 2016

(54) IMAGE STITCHING IN A MULTI-CAMERA ARRAY

(71) Applicant: GoPro, Inc., San Mateo, CA (US)

(72) Inventors: Balineedu Chowdary Adsumilli, San Mateo, CA (US); Scott Patrick Campbell, Belmont, CA (US); Timothy MacMillan, Woodside, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/754,695

(22) Filed: Jun. 30, 2015

(51) Int. Cl.
G06K 9/20 (2006.01)
G06T 3/40 (2006.01)
G06T 7/00 (2006.01)

(52) U.S. Cl.
CPC ............ *G06T 3/4038* (2013.01); *G06T 7/0022* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2007/0237420 A1* | 10/2007 | Steedly | ............... | G06K 9/32 382/284 |
| 2010/0014780 A1* | 1/2010 | Kalayeh | ............... | G06T 1/00 382/284 |

FOREIGN PATENT DOCUMENTS

WO    WO 2013130071 A1 *    9/2013    .............. G06T 11/60

* cited by examiner

*Primary Examiner* — Stephen R Koziol
*Assistant Examiner* — Amandeep Saini
(74) *Attorney, Agent, or Firm* — Fenwick & West LLP

(57) ABSTRACT

Images captured by multi-camera arrays with overlap regions can be stitched together using image stitching operations. An image stitching operation can be selected for use in stitching images based on a number of factors. An image stitching operation can be selected based on a view window location of a user viewing the images to be stitched together. An image stitching operation can also be selected based on a type, priority, or depth of image features located within an overlap region. Finally, an image stitching operation can be selected based on a likelihood that a particular image stitching operation will produce visible artifacts. Once a stitching operation is selected, the images corresponding to the overlap region can be stitched using the stitching operation, and the stitched image can be stored for subsequent access.

18 Claims, 9 Drawing Sheets

IMAGE STITCHING IN A MULTI-CAMERA ARRAY

BACKGROUND

1. Technical Field

This disclosure relates to camera arrays and, more specifically, to methods for stitching images captured by a camera array.

2. Description of the Related Art

Corresponding images captured by multiple cameras in a multi-camera array can be combined (or "stitched") together to create larger images. The resulting stitched images can include a larger field of view and more image data than each individual image. Generating stitched images using a multi-camera array can be more cost-effective than capturing an image of a similar field of view and image data using a higher-resolution and/or higher-performance camera. However, the process of stitching images can produce stitched images with stitching artifacts at or near the stitch lines.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Multi-Camera Array Configuration

A multi-camera array (or multi-camera system) includes a plurality of cameras, each camera having a distinct field of view. For example, the camera array can include a 2×1 camera array, a 2×2 camera array, a spherical camera array (such that the collective fields of view of each camera in the spherical camera array covers substantially 360 degrees in each dimension), or any other suitable arrangement of cameras. Each camera can have a camera housing structured to at least partially enclose the camera. Alternatively, the camera array can include a camera housing structured to enclose the plurality of cameras. Each camera can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. In another embodiment, the camera array includes some or all of the various indicators, various input mechanisms, and electronics and includes the plurality of cameras. A camera housing can include a lens window structured on the front surface of the camera housing and configured to substantially align with the camera lenses of the plurality of cameras, and one or more indicator windows structured on the front surface of the camera housing and configured to substantially align with the camera indicators.

Figure 1A:
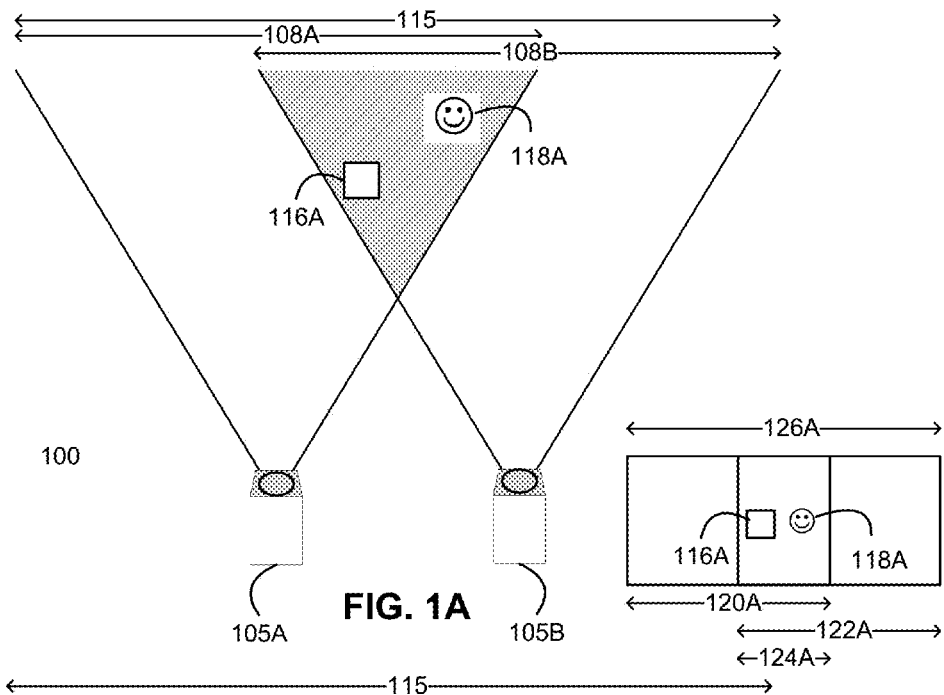
FIG. 1A illustrates a first multi-camera system, according to one embodiment.
Figure 1B:
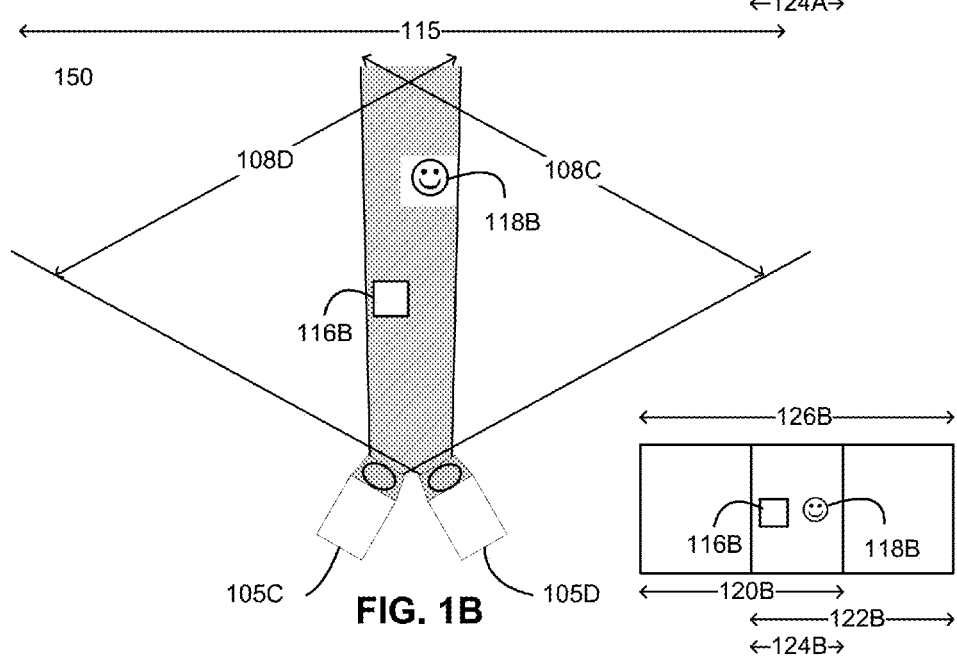
FIG. 1B illustrates a second multi-camera system, according to one embodiment.

FIGS. 1A and 1B illustrate various multi-camera systems, according to example embodiments. The multi-camera system 100 of FIG. 1A includes two cameras 105A and 105B. The camera 105A is used to capture a left side (e.g., field of view 108A) of a shared field of view 115 as the image 120A and the camera 105B is used to capture a right side (field of view 108B) of the shared field of view 115 as the image 122A. A portion of the field of view 108A of the left camera 105A and a portion of the field of view 108B of the right camera 105B represent a common field of view, as illustrated by the shaded portion of the shared view 115. Within the common field of view are image features 116A and 118A. The images 120A and 122A can be stitched together using an overlap region 124A common to both images, forming stitched image 126A representative of the entire field of view 115.

To combine the image 120A and 122A, a stitching algorithm can be applied to the overlap region 124A to combine the portions of the image 120A and the image 122A representative of the overlap region 124A. Stitching algorithms will be discussed below in greater detail. As stitching algorithms combine two or more portions of image data, stitching can cause various stitching artifacts due to differences between the two or more portions caused by, for instance, object movement during image capture, parallax error, image feature complexity, object distance, image textures, and the like. For instance, the combination of image portions representative of a human face can result in disfigurement of facial features. Similarly, the combination of image portions with particular textures can result in a noticeable visual disruption in an otherwise consistent texture.

In some embodiments, stitching artifacts (such as those caused by image parallax error) can be at least partially mitigated by manipulating the configuration of the cameras within the multi-camera system. The multi-camera system 150 of FIG. 1B includes cameras 105C and 105D. The camera 105C captures a left side (e.g., field of view 108C) of the shared view 115 as the image 120B and the camera 105D captures a right side (e.g., field of view 108D) of the shared view 115 as the image 122B. As with the embodiment of FIG. 1A, the fields of view 108C and 108D include a common field of view represented by the shaded portion of the field of view 115. Within the common field of view are the image features 116B and 118B, which are present within the overlap region 124B of the images 120B and 122B, which are stitched together to form stitched image 126B. In contrast to the embodiment of FIG. 1A, in which the cameras 105A and 105B face the same direction and resulting in an angled common field of view, the cameras 105C and 105D of the embodiment of FIG. 1B face overlapping directions and resulting in a largely parallel common field of view (e.g., the width of the common field of view is substantially the same at multiple distances from the cameras 105C and 105D), minimizing parallax error of objects within the common field of view. By minimizing parallax error, the embodiment of FIG. 1B can partially reduce stitching artifacts within the stitched image 126B caused by the parallax error (for instance, by aligning the location within the overlap region 124B of each image feature for each of the images 120B and 122B). In some embodiments, the orientation of cameras 105C and 105D is such that the vectors normal to each camera lens of cameras 105C and 105D intersect within the common field of view.

Example Stitching Algorithms

In some embodiments, the number of stitching artifacts resulting from stitching images (and accordingly, the quality of the stitched image) corresponds to the quality of the stitching algorithm used to stitch the images. Generally, stitching algorithms that require more processing power produce higher quality stitched images (and are referred to as "high quality" or "high power" stitching algorithms) than stitching algorithms that require less processing power (referred to as "low quality" or "low power" stitching algorithms. Accordingly, image stitching algorithms of varying quality or power can be available to an image stitching system, and generally the quality or power of the stitching algorithm selected for use in stitching images is proportional to the quality of the resulting stitched image.

A first example of a image stitching algorithm can identify portions of each of two or more images representative of an overlap region between the two or more images, can align the identified portions of the images, and can average or feather the image data (such as the pixel color data) of the identified portions of the images to produce a stitched image. In some embodiments, images without overlap regions can be stitched by aligning the edges of the images based on image features in each image and averaging image data across the aligned edges to produce a stitched image.

A second example of an image stitching algorithm that is a higher quality image stitching algorithm than the first example image stitching algorithm can analyze the depth of image features within an overlap region of two or more images. For instance, for an object (such as a vehicle, person, or tree) within a common field of view for two cameras, the depth of the object can be identified and associated with the image feature within each image captured by the two cameras corresponding to the object. Image feature depth can be determined in any suitable way, for instance based on parallax information, based on a known size of the corresponding object and the dimensions of the image feature within the image, and the like.

After identifying a depth associated with an image feature, an image warp operation selected based on the identified depth can be applied to the image feature within each image. The image warp operation adjusts the shape and size of the image feature within each image such that the shape and size of the image feature is substantially similar across all images including the image feature. The amount of the adjustment to the shape and size of the image feature (or, the amount of warp applied to the image feature) is inversely proportional to the identified depth of the image feature, such that less warp is applied to image features far away from the cameras than is applied to image features close to the cameras. After an image warp operation is applied to one or more image features within the overlap region, the images can be aligned by aligning the warped image features, and the image data within the overlapping region outside of the aligned image features can be averaged or otherwise combined to produce a stitched image. The stitched image includes the aligned overlap region of the images and portions of each image outside of the overlap region.

A third example of an image stitching algorithm that is a higher quality image stitching algorithm than the first and second example image stitching algorithms can determine the location of image features by analyzing the location of the image features within video frames temporally adjacent to the images being stitched. For instance, if a first image feature at a first depth suddenly becomes visible in an image within a sequence of images (for instance as a result of an occluding second image feature at a second, closer depth moving to a non-occluding position), the first depth can be identified by analyzing subsequent frames within the sequence of images, and a warp can be applied based on the determined first depth. Note that without analyzing the subsequent frames, the overlapping of the first object and the second object from previous frames may result in a warp operation applied to the first object but based on the second depth of the second object. Accordingly, as the third example image stitching algorithm determines depth information for image features based on an analysis of temporally proximate images within an image series, the third example image stitching algorithm requires more processing power than the second example image stitching algorithm (which determines depth information based only on the image in which an image feature occurs).

In some embodiments, image stitching algorithms can iteratively apply stitching operations that combine and/or smooth image data within an overlap region of two or more images such that the more iterations of stitching operations applied to an overlap region, the better the quality of the resulting stitched image. In such embodiments, applying more iterations of stitching operations requires more processing power, and thus selecting the quality of an image stitching algorithm can correspond to selecting a number of iterations of one or more operations to perform within the image stitching algorithm (where an increase in the number of iterations performed corresponds to an increase in stitching operation quality, and vice versa). Examples of iterative operations can include smoothing operations, image data combination operations (such as averaging pixel data), depth determination operations, operations to determine the composition of image data, image feature alignment operations, resolution and/or texture mapping operations, facial feature alignment operations, warping operations, and the like.

In some embodiments, selecting a quality of an image stitching operation comprises selecting a number of frames before and after a current frame to analyze for depth information or motion information (where an increase in the number of frames before and after a current frame selected for analysis corresponds to an increase in stitching operation quality, and vice versa).

In some embodiments, an overlap region between two or more images is divided in image blocks, and each individual block is aligned, warped, and stitched as described above. In such embodiments, the size of the image blocks in the overlap region is inversely proportional to the quality of stitching algorithm (where small image blocks correspond to higher quality stitching algorithms than larger image blocks), and selecting a quality of an image stitching operation can include selecting an overlap region image block size for use in stitching the images corresponding to the overlap region together. In some embodiments, the resolution of portions of images corresponding to an overlap region between the images is reduced in lower quality image stitching algorithms to simplify the stitching of the images, and the resolution of the portions of images corresponding to the overlap region is maintained in higher quality image stitching algorithms.

In some embodiments, image stitching operations can be associated with preparation operations (or "pre-processing" operations) that can be performed before the image stitching operation in order to expedite the image stitching operation. For instance, image data for each of two images associated with an overlap region between the images can be accessed, stored in local memories or buffers, and/or pre-processed before performing the stitching operation. Examples of pre-processing operations include altering the resolution of the accessed image data, dividing the accessed image data into blocks, determining the depth of image objects represented by the accessed image data, and the like. In some embodiments, image data from frames before and after the images being stitched can be accessed and/or pre-processed. Pre-processing operations can correspond to particular stitching operations such that particular pre-processing operations are performed before, based on, and in response to a determination to perform a corresponding stitching operation.

It should be noted that when a stitching operation is selected according to the methods described herein, the quality of the selected stitching operation can correspond to the quality of the stitching operations described above. For instance, a low quality stitching operation can correspond to the first example image stitching algorithm, a medium quality stitching operation can correspond to the second example image stitching algorithm, and a high quality stitching operation can correspond to the third example image stitching algorithm. Likewise, a high quality image stitching operation can include more image stitching operation iterations or more frames before and after a current frame selected for analysis than a low quality image stitching operation. Finally, when reference is made to selecting a second "higher quality" image stitching operation than a first image stitching operation, the second image stitching operation can be selected from a set of image stitching operations (such as those described herein) that are higher in quality or power than the first image stitching operation, or the number of iterations, analyzed frames, or other operations performed by the first image stitching operation can be increased, thereby resulting in a second image stitching operation of higher quality than the first image stitching operation.

Example Multi-Camera Environment

Figure 2:
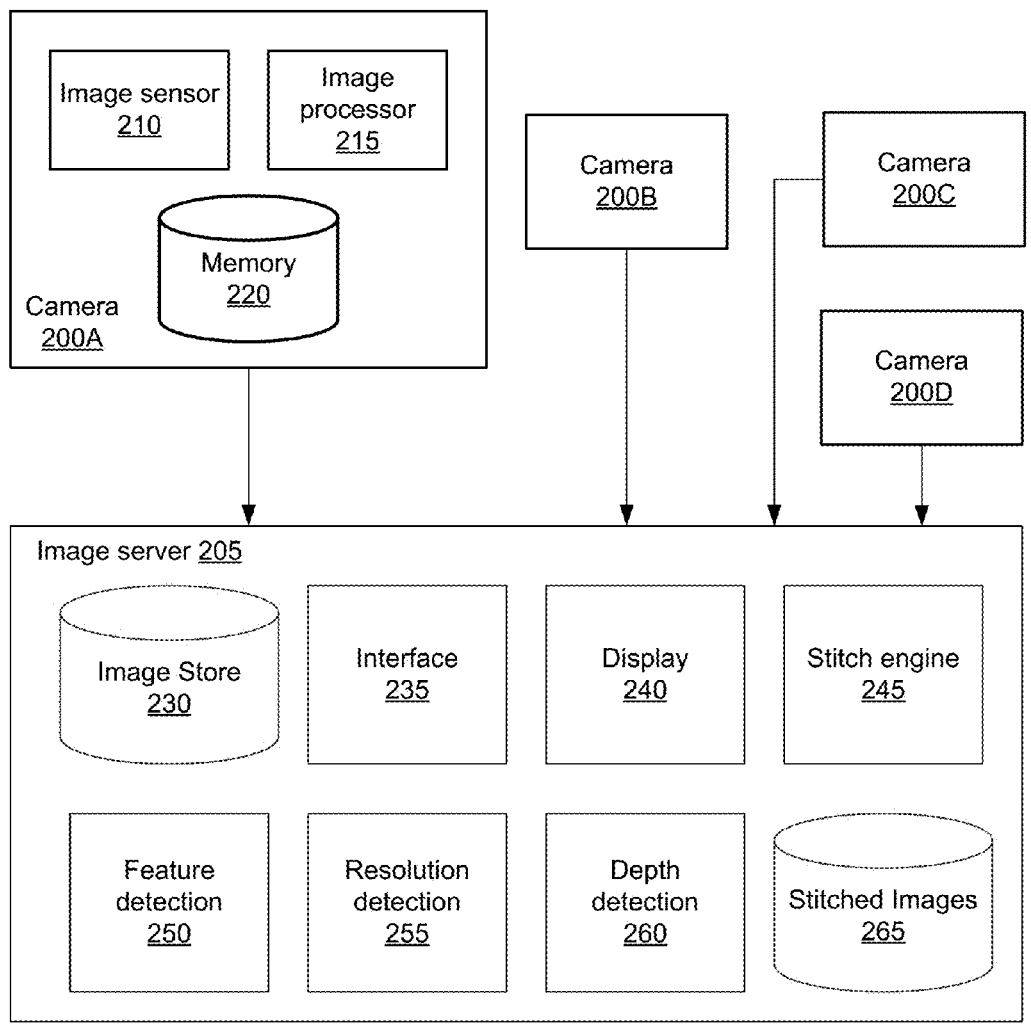
FIG. 2 illustrates a multi-camera array stitching environment, according to one embodiment.

FIG. 2 illustrates a multi-camera array stitching environment, according to one embodiment. The environment of FIG. 2 includes four cameras, 200A-200D, and an image server 205. It should be noted that in other embodiments, the environment of FIG. 2 can include fewer or more cameras, and can include additional components or systems than those illustrated herein. Further, it should be noted that in some embodiments, the image server 205 can be implemented within a camera 200 itself, though the cameras and the image server will be described separately herein for the purposes of simplicity. The image server 205 can be communicatively coupled to the cameras 200 by any suitable means, for instance through a wired connection or a wireless connection, and through one or more networks, such as a local area network, a peer-to-peer network, or the internet. In the embodiment of FIG. 2, two or more of the cameras 200 share one or more overlap regions.

Each camera 200 includes an image sensor 210, an image processor 215, and a memory 220. The image sensor 210 is a hardware component is configured to capture image data based on light incident upon the image sensor at the time of capture. The captured image data can be stored in the memory 220 without further processing (as "raw" image data), or can undergo one or more image processing operations by the image processor 215. The image processor 215 is a hardware chip configured to perform image processing operations on captured image data and store the processed image data in the memory 220. The memory 220 is a non-transitory computer-readable storage medium configured to store computer instructions that, when executed, perform camera functionality steps as described herein.

Each camera 200 can additionally include other components not illustrated in FIG. 2, such as one or more microcontrollers or processors (for performing camera functionalities), a lens, a focus controller configured to control the operation and configured of the lens, a synchronization interface configured to synchronize the cameras (for instance, configured to synchronize camera 200A with camera 200B, or to synchronize each of the cameras 200A-200D with the image server 205), one or more microphones, one or more displays (such as a display configured to operate as an electronic viewfinder), one or more I/O ports or interfaces (for instance, enabling the cameras 200 to communicatively couple to and communicate with the image server 205), one or more expansion pack interfaces, and the like.

The image server 205 includes an image storage module 230, an interface module 235, a display 240, a stitching engine 245, a feature detection module 250, a resolution detection module 255, a depth detection module 260, and a stitching images storage module 265. The image server 205 receives images from the cameras 200 and stores the images in the image storage module 230. In some embodiments, the cameras 200 are synchronized such that each camera captures an image at substantially the same time, and such that each image is timestamped with a time representative of the time at which the image is captured (for instance, within image metadata). In some embodiments, the image server 205 is configured to identify substantially similar timestamps within received images, and is configured to associate and store images with substantially similar timestamps.

In some embodiments, the image server 205 is configured to process received images to identify overlap regions common to two or more images, for instance by identifying portions of the two or more images having similar or substantially identical image data. In alternative embodiments, the image server 205 knows in advance of the position and orientation of each camera 200, and thereby knows in advance the presence of one or more common overlap regions between images captured by and received from the cameras 200. The image server 205 can associate and store received images with common overlap regions. In such embodiments, the amount of calibration required for identifying the position and orientation of the common overlap regions helps with defining the strength of the stitching required, thereby aiding the selection process with which stitching algorithm from the previous section is adequately applicable in the present given multi-camera scenario.

The interface module 235 is configured to provide an interface to a user of the image server 205. For instance, the interface module 235 can provide a graphical user interface (GUI) to a user, enabling a user to view one or more images stored by the image server 205 on the display 240, to use the image server 205 as an electronic viewfinder (displaying images representative of views of each camera 200 on the display 240), to select one or more settings for or to configure one or more cameras 200 or the image server 205, and the like. The interface 235 can also provide a communicative interface between the image server 205 and one or more cameras 200, enabling the image server 205 to receive images and other data from the cameras 200, and providing configuration or image capture instructions to the one or more cameras 200. The display 240 is a hardware display configured to display one or more interfaces provided by the interface module 235, to display one or more images stored by the image server 205, or to display information or image data associated with one or more cameras 200.

The stitch engine 245 is a processing engine configured to perform one or more image stitching operations on images stored or received by the image server 205. In some embodiments, the stitching engine 245 can perform a number of different stitching operations of varying image stitching power or quality. As will be discussed in greater detail herein, the stitch engine 245 can select one or more stitching operations to perform based on a number of factors, such as the proximity of an image view window (the portion of the one or more images being displayed to and viewed by a user) displayed to a user to an image overlap region, the presence of one or more features within or near an image overlap region, a priority of features within or near an image overlap region, the resolution of image portions within or near an image overlap region, a likelihood that an image stitching operation will produce image artifacts, a depth of image features or objects within or near an image overlap region, and the like. Stitched images can be displayed on the display 240, outputted to one or more cameras 200 or any other external entity, or stored within the stitched images storage module 265. The stitch engine 245 can be a standalone hardware processor, or can be implemented within a larger image processing engine that includes one or more hardware processors.

The feature detection module 250 is configured to identify and classify image features within images received or stored by the image server 205. In some embodiments, the feature detection module can detect humans, human faces, human hands or limbs, vehicles, animals, plants or trees, edges or surfaces of objects, lines or curves within the image, resolutions or textures within the image, background objects, or any other suitable image feature present within an image. The feature detection module 250 can classify the priority of each detected feature, for instance as "high priority" or "low priority". In some embodiments, the priority classification assigned by the feature detection module 250 to an image feature corresponds to the importance of the image feature, the likelihood that a low quality stitching algorithm will produce undesirable image artifacts within the image feature, or the likelihood that a user viewing a stitched image will notice a distortion of the image feature resulting from the stitching. For example, human faces and image edges can be classified as "high priority" (thus requiring a high quality stitching operation) while background textures and objects (such as leafy plants or the sky) can be classified as "low priority" (in which cases, a low quality stitching operation may be suitable).

In some embodiments, the feature detection module 250 automatically detects features in images to be stitched together, without input form a user of the image server 205, for instance using one or more image recognition operations. In some embodiments, a user identifies or selects features within an image. In some embodiments, image features are identified within all images received at the image server 205. In other embodiments, the feature detection module 250 only detects features in images to be stitched together, for instance in response to a request to stitch images together from the stitch engine 245 or from a user of the image server 205. In some embodiments, image features are identified during the pre-processing of images, for instance during the pre-processing of an overlap region of images being stitched together, before image stitching operations are performed. In some embodiments, the priority of identified image features is classified automatically, based on a predetermined priority of each image feature type (such as "faces" or "background texture"). Alternatively, a user of the image server 205 can select a priority for each image feature, either in advance of stitching images together (for instance, based on the image feature type), or during the image stitching operation.

The resolution detection module 255 determines the resolution of image portions. The resolution detection module 255 can segment each image into a plurality of image blocks, and can determine the resolution of each block. In some embodiments, the resolution detection module 255 determines the resolution of image portions in advance of stitching a corresponding image, for instance upon receipt of the image at the image server 205. Alternatively, the resolution detection module 255 can determine the resolution of image portions of images in response to a request to stitch the images together, for instance from the stitch engine 245 or a user of the image server 205. In some embodiments, the resolution detection module 255 determines the resolution of image portions during pre-processing of the images, for instance during the pre-processing of an overlap region of images being stitched together, before image stitching operations are performed. In some embodiments, the resolution detection module 255 only determines the resolution of image portions within or adjacent to an overlap region between images.

The depth detection module 260 determines the depth of image features within images. The depth detection module 260 can identify image features by performing object recognition operations on images, or can identify image features identified by the feature detection module 250. As used herein, the determined depth of an image feature in an image is the distance of the object corresponding to the image feature from the camera that captured the image at the time of capturing the image. Image feature depth can be determined in any suitable way, for instance based on a parallax measurement corresponding to the image feature from two or more images captured by adjacent cameras in a multi-camera array.

In some embodiments, the depth detection module 260 can determine image feature depth based on pre-determined proportions and/or dimensions of particular image feature types. For example, if a face is detected within an overlap region, and a camera array used to capture images corresponding to the overlap region have known fields of view, the depth detection module 260 can determine a depth of the face based on a percentage of the field of view in one or more of the images associated with the detected face. In some embodiments, the depth detection module 260 can access pre-determined proportion and/or dimension ranges for each of a plurality of image types, and upon detecting an image feature corresponding to one of the plurality of image types and determining the percentage of field of view of one or more cameras corresponding to the image feature, can access a mapping table that maps field of view percentages to depths based on the pre-determined proportion and/or dimension ranges, and can determine a depth of the image feature using the mapping table. For example, a basketball is known to have a particular range of dimensions, and as a result, the mapping table can map detection field of view percentages corresponding to a detected basketball to depths based on the known range of dimensions. Continuing with the previous example, the depth detection module 260, in response to detecting the face within the overlap region, can identify the dimensions of the detected face, can determine the percentage of a camera's field of view corresponding to one or more of the face's dimensions, and can determine the depth of the face based on the determined percentages of the camera's field of view (for instance, by querying a mapping table mapping field of view percentages to depths based on pre-known facial dimension ranges).

In some embodiments, the depth detection module 260 determines the depth of image features in advance of stitching the corresponding pair of images, for instance upon receipt of the image at the image server 205. Alternatively, the depth detection module 260 can determine the depth of image features in response to a request to stitch the images together, for instance from the stitch engine 245 or a user of the image server 205. In some embodiments, the depth detection module 260 determines the depth of image features during preprocessing of the images, for instance during the pre-processing of an overlap region of images being stitched together, before image stitching operations are performed. In some embodiments, the depth detection module 260 only determines the depth of image features within or adjacent to an overlap region between images.

Image Stitching Based on View Window Location

The image stitching operations used to stitch two or more overlapping images together can be selected based on a view window of a user of the image server 205 when viewing the images. For instance, the stitch engine 245 can select an image stitching operation based on a location of a view window within one or more overlapping images displayed on the display 240. When the view window of a user is not near an overlap region (more than a threshold distance away from the nearest overlap region), the stitch engine 245 can use a low quality or low power stitching operation to stitch the overlapping images together, or can forego the image stitching operation altogether. As the view window in such instances is located entirely within a single image, no image stitching is needed in order to display the portion of the image corresponding to the view window.

When a view window of a user is within a threshold distance of an overlap region, or is located at least in part within an overlap region, the stitch engine 245 can select a high quality or high power image stitching operation for use in stitching together the images associated with the overlap region. As the view window in such instances includes a portion of the overlap region, or is close enough to the overlap region that the user might suddenly move the view window to include a portion of the overlap region, using a high quality or high power image stitching operation to stitch together the images corresponding to the overlap region can beneficially improve the quality of the displayed stitched image.

In other words, the quality of image stitching operations performed by the stitch engine 245 when stitching images together can be inversely proportional to the proximity of the view window to an overlap region corresponding to the images (the closer the view window is to the overlap region, the higher the quality of the stitching operations performed, and vice versa). As discussed above, low quality image stitching operations can include feathering or average image data in an overlap region, while high quality image stitching operation can include determining object depth and applying warps to the portions of images corresponding to an overlap region based on the determined object depth. Similarly, as discussed above, the quality of an image stitching operation can be proportional to the number of operation iterations, the number of frames before and after the images being stitched that are analyzed for the stitching operation, or any other suitable image stitching factor.

When a view window of a user is within a first threshold distance of an overlap region, but is greater than a second threshold distance of the overlap region, the stitch engine 245 can perform one or more preprocessing operations on the images corresponding to the overlap region in order to prepare the images for stitching, potentially improving the performance of the stitching operations. As the view window in such instances may be moved suddenly to include a portion of the overlap region, performing pre-processing operations on the images can beneficially reduce the amount of time required to perform image stitching operations, potentially enabling higher quality image stitching operations to be performed more efficiently.

In some embodiments, the threshold distances described herein are determined in advance and are static. In other embodiments, the threshold distances are determined dynamically. For example, the threshold distances can be based on a determined likelihood that a user will move the view window to include a portion of the overlap region within a pre-determined interval of time. Similarly, the threshold distances can be based on a location of a stitch line within the overlap region, a velocity of a movement of the view window, a velocity of an object or image feature within a sequence of captured images, a history of a user's movement of a view window, user settings, or any other suitable factor.

It should be noted that in some embodiments, the view window is located within images previously captured by the cameras 200 and provided to the image server 205 for storage. In such embodiments, the images are stitched together in response to the view window moving to within a threshold distance of an overlap region corresponding to the images, and the stitched image can be stored for subsequent access. In other embodiments, one or more preview images are accessed by the image server 205, each preview image representative of a current view of one of the cameras 200 that, when displayed (for instance on display 240) enables a user to use the displayed preview image as an electronic viewfinder for the corresponding camera. In such embodiments, the preview images are stitched together in response to the view window moving to within a threshold distance of an overlap region corresponding to the preview images.

In some embodiments, the view window location in the current and future frames are predicted from the contents and/or image features present in the previous video frames. In particular, if the content includes image features such as faces, people, moving balls, moving objects of interest, changing regions or areas of interest, and other such content/scene motion that is of particular interest to the viewer, these features and their associated motion is tracked in the previous and current frame and predicted for future frames. The motion predictions are then used to evaluate the possibility of either the view window moving to this area of interest or the image feature moving into the view window. If either of these occurs close to the overlap region such that the image feature or the view window is moving towards or away from the stitch region, then the stitching algorithm is selected accordingly. For example, if the image feature is predicted to be moving towards the stitch region, then a higher quality stitch algorithm is selected, where as if the image feature is predicted to be moving away from the stitch region, then a lower quality stitch algorithm is selected.

Figure 3A:
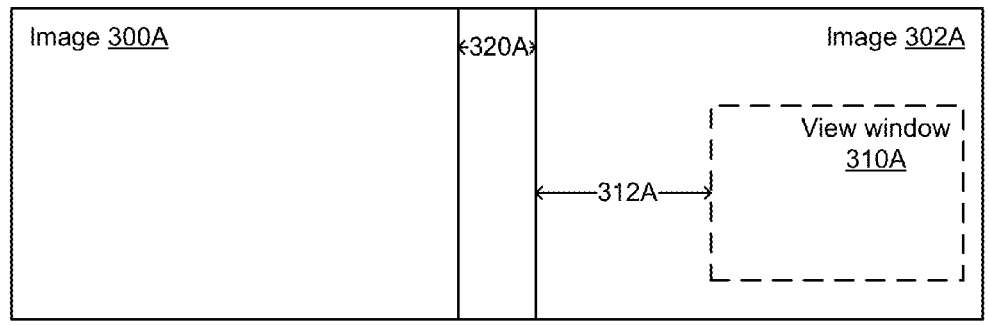
FIGS. 3A-3C illustrate image stitching based on a location of a view window within images captured by a multi-camera array, according to one embodiment.
Figure 3B:
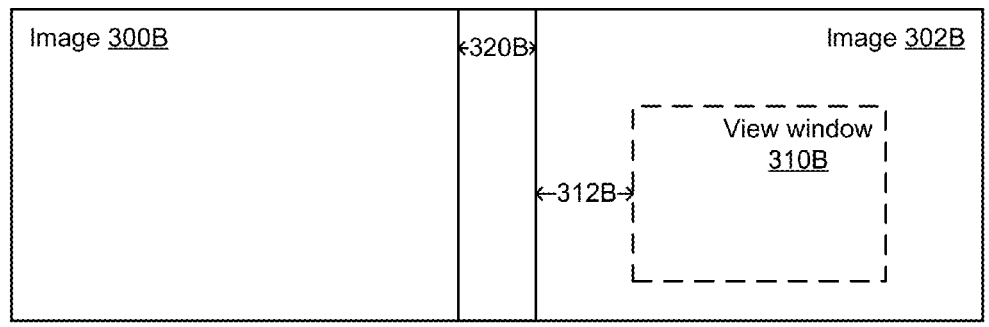
Figure 3C:
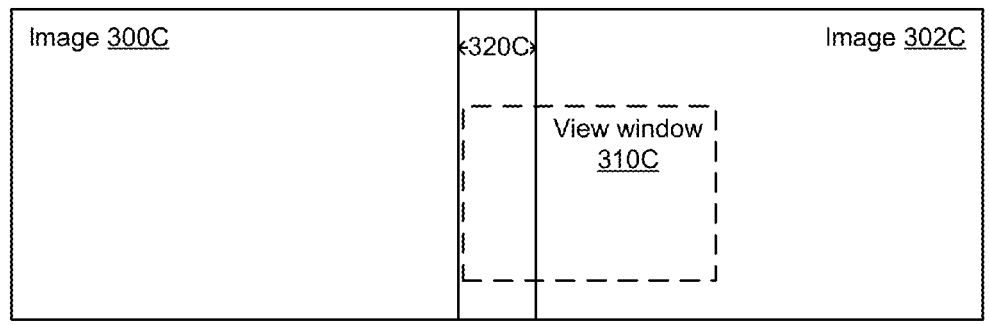

FIGS. 3A-3C illustrate image stitching based on a location of a view window within images captured by a multi-camera array, according to one embodiment. In FIG. 3A, images 300A and 302A share an overlap region 320A. In the embodiment of FIG. 3A, a user's view window 310A is located a first distance 312A from the overlap region 320A. In this embodiment, the distance 312A is greater than a first threshold distance. As a result, the stitch engine 245 either does not stitch the images 300A and 302A together, or performs a low quality stitching operation, for instance by averaging image data from the image 300A corresponding to the overlap region 320A and image data from the image 302A corresponding to the overlap region 320A.

In FIG. 3B, images 300B and 302B share an overlap region 320B. In the embodiment of FIG. 3B, a user's view window 310B is located a second distance 312B less than the first distance 312A from the overlap region 320B. In this embodiment, the distance 312B is less than the first threshold distance but greater than the second threshold distance. As a result, the stitch engine 245 can perform pre-processing operations on image data corresponding to the overlap region 320B, such as determining the depth of image features within the image, accessing image data for frames before and after the images 300B and 302B in a series of frames, and the like.

In FIG. 3C, images 300C and 302c share an overlap region 320C. In the embodiment of FIG. 3C, a user's view window 310C is located at least in part within the overlap region 320C. In other words, the view window 310C is located within the second threshold distance from the overlap region 320C. As a result, the stitch engine 245 can perform a high quality stitching operation, for instance by determining the depth of each image feature within the overlap region 320C, and applying a warp to the portions of images 300C and 302C corresponding to the overlap region based on the determined depths.

Figure 4:
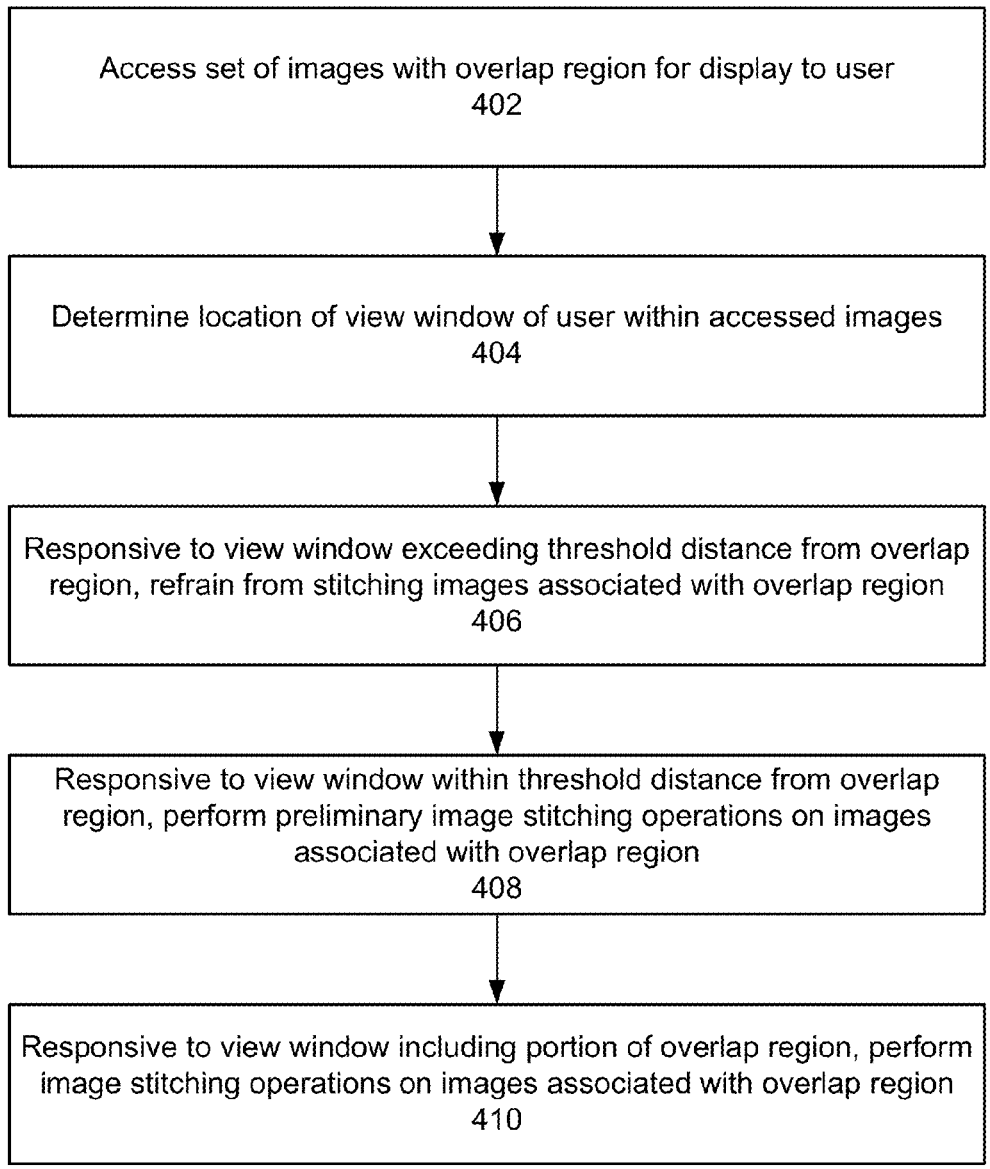
FIG. 4 is a flow chart illustrating a process for stitching images based on a location of a view window within images captured by a multi-camera array, according to one embodiment.

FIG. 4 is a flow chart illustrating a process for stitching images based on a location of a view window within images captured by a multi-camera array, according to one embodiment. A set of images with one or more overlap regions is accessed 402. The accessed set of images can be images previously captured by a set of cameras for stitching in post-processing, or can be preview images for use as electronic viewfinders for a set of cameras.

The location of a view window of a user within one or more of the accessed images is determined 404. Responsive to the view window exceeding a first threshold distance from the overlap region, the images corresponding to the overlap region are not stitched 406 together. Alternatively, low quality image stitching operations may be performed to stitch the images together. Responsive to the view window being within the first threshold distance but greater than a second threshold distance from the overlap region, preliminary image stitching operations are performed 408 on images corresponding to the overlap region. Responsive to the view window being within the second threshold distance from the overlap region or including a portion of the overlap region, image stitching operations (for instance, high quality image stitching operations) are performed 410 on the images corresponding to the overlap region.

Image Stitching Based on Image Content

The stitching operations used to stitch two or more overlapping images together can be selected based on image features or image feature types within an overlap region, based on the importance or priority of such features, and/or based on a likelihood that a stitching operation will result in noticeable/visible image artifacts or feature distortions. For instance, the stitch engine 245 can select an image stitching operation based on a type of image feature, such as a high quality stitching operation if the image feature is a face (which may be particularly susceptible to noticeable image artifacts), or a low quality operation if the image feature is background foliage (which may not be particularly susceptible to noticeable image artifacts).

The stitching engine 245 can identify image features within an overlap region (for instance, via the feature detection module 250). As noted above, types of image features can include faces and other body parts, people, animals, vehicles, objects, lines, edges, curves, surfaces, textures, points, or any other suitable image feature. The stitch engine 245 can classify each identified image feature by image feature type and can identify the location of each identified image feature within the overlap region. Image features can be identified within an overlap region automatically, for instance in advance of receiving a request to stitch images together. In some embodiments, image features can be identified within an overlap region in response to receiving a request to stitch images together, for instance from an image server 205 component or from a user of the image server 205.

As noted above, the stitch engine 245 can also classify each identified image feature by image feature priority (for instance, via the feature detection module 250). In some embodiments, image feature priority is selected from the set "low priority" and "high priority", or from the set "low priority", "medium priority", and "high priority". The image feature priority for each identified image feature can be determined automatically, for instance in advance of receiving a request to stitch images together. In some embodiments, image feature priority can be determined in response to receiving a request to stitch images together, for instance from an image server 205 component or from a user of the image server 205. In some embodiments, image feature priority can also be determined by observing the amount of visible artifacts and/or the degradation to the image quality a particular stitch algorithm is expected to generate/cause.

In some embodiments, the stitch engine 245 divides the overlap region into image sub-blocks, and classifies the priority of each sub-block based on an image feature type or image feature priority for one or more image features located within the sub-block. In such embodiments, a sub-block can be classified based on the hierarchical highest priority image feature within the sub-block. For example, if a sub-block included both a "low priority" image feature and a "medium priority" image feature, the sub-block can be classified as a "medium priority" sub-block. In some embodiments, instead of dividing the overlap region into sub-blocks, the entire overlap region is classified based on the highest priority image feature within the overlap region.

The stitch engine 245 can select a stitching operation for use in stitching together images associated with an overlap region based on a priority of one or more image features within the overlap region. In some embodiments, the stitch engine 245 can select one stitching operation for the entire overlap region (for instance, based on the highest priority image feature within the overlap region). In other embodiments, the stitch engine 245 can select a stitching operation for each image feature (based on the priority classification of the image feature), and can select an additional stitching operation for portions of the overlap region not associated with an image feature (for instance, a low quality image stitching operation). In yet other embodiments, the stitch engine 245 can select a stitching operation for each overlap region sub-block, for instance based on the priority classification of the sub-block.

The stitching operations selected by the stitch engine 245 for use in stitching images associated with an overlap region can be pre-determined. For instance, each image feature priority classification can be mapped to a particular stitching operation, or to a particular stitching operation priority. In such embodiments, when a particular image feature priority classification, overlap region priority classification, or overlap region sub-block priority classification is determined, the stitch engine 245 can select the stitching operation mapped to the priority classification, or can select a stitching operation associated with a stitching operation priority mapped to the priority classification. In some embodiments, the quality of the stitching operation selected is proportional to the priority of the image feature, overlap region, or overlap region sub-block. For example, high quality stitching operations are selected for high priority image features/overlap regions/sub-blocks, while lower quality stitching operations are selected for lower priority image features/overlap regions/sub-blocks.

In other embodiments, a user can select a stitching operation or stitching operation priority for each image feature, for the overlap region, or for each overlap region sub-block. It should be noted that in some embodiments, instead of classifying the priority of each image feature or sub-block, the stitching engine can select a stitching operation for the overlap region, for each image feature, or for each sub-block based on the a type of each image feature. For example, high quality image stitching operations can be selected for faces within an overlap region, and low quality image stitching operations can be selected for trees or background portions within an overlap region. In addition, stitching operations can be selected based on an available power to the stitch engine 245 (such as an amount of available battery power), an amount of available processing resources available to the stitch engine 245, an amount of time available to perform the stitching operations available to the stitch engine 245, or based on any other suitable factor.

After selecting one or more stitching operations for use in stitching together images associated with an overlap region, the stitch engine 245 applies the stitching operations to the images. In embodiments where a single stitching operation is selected for the entire overlap region, the stitch engine 245 stitches together the images using the stitching operation. In embodiments where a stitching operation is selected for each image feature and a stitching operation is selected for the portions of the overlap region not associated with an image feature, the stitch engine 245 can stitch together portions of the images associated with the overlap region corresponding to the image features using the stitching operations selected for the image features, and can stitch together the portions of the images associated with the remainder of the overlap region using the stitching operation selected for the portions of the overlap region not associated with an image feature. In embodiments where a stitching operation is selected for each overlap region sub-block, the stitch engine 245 can stitch together the portions of the images associated with an overlap region sub-block using the selected stitching operation corresponding to the sub-block.

Figure 5A:
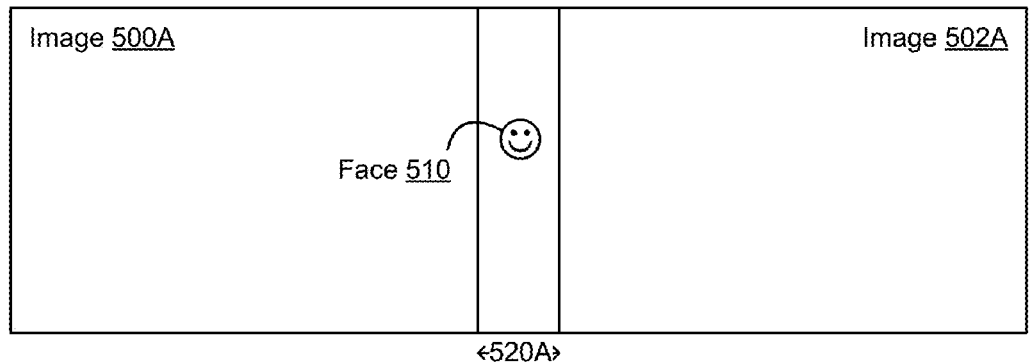
FIGS. 5A-5C illustrate content-specific image stitching for images captured by a multi-camera array, according to one embodiment.
Figure 5B:
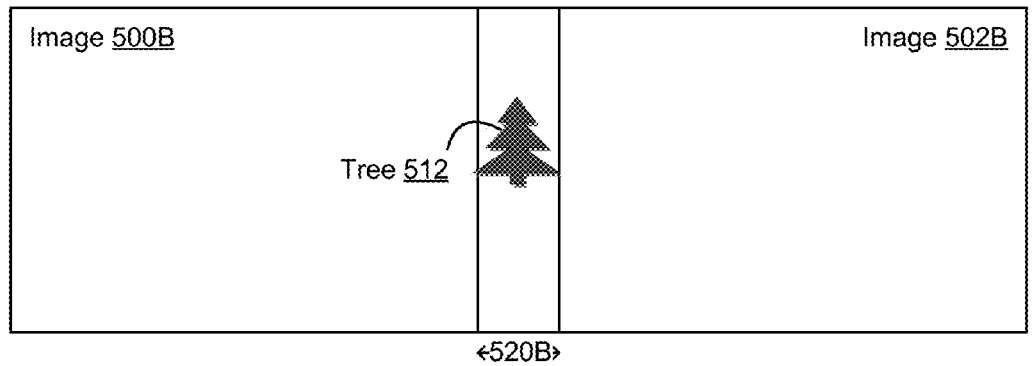
Figure 5C:
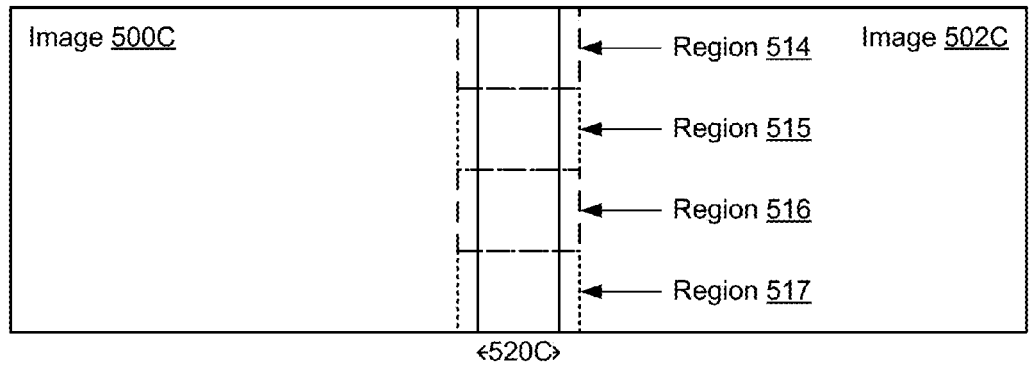

FIGS. 5A-5C illustrate content-specific image stitching for images captured by a multi-camera array, according to one embodiment. FIG. 5A includes an image 500A and an image 502A sharing a common overlap region 520. In the embodiment of FIG. 5A, the overlap region 520 includes a face 510. In the embodiment of FIG. 5A, faces are classified as high priority image features. Accordingly, the stitch engine 245 selects a high quality stitching operation (for instance, a stitching operation that applies warps based on image feature depths determined using frames before and after the images 500A and 502A), and stitches together the portions of the images 500A and 502A corresponding to the overlap region 520A using the selected high quality stitching operation.

FIG. 5B includes an image 500B and an image 502B sharing a common overlap region 520B. In the embodiment of FIG. 5B, the overlap region 520B includes a tree 512. In the embodiment of FIG. 5B, trees are classified as low priority image features. According, the stitch engine 245 selects a low quality stitching operation (for instance, a stitching operation that features images or simply averages image data), and stitches together the portions of the images 500B and 502B corresponding to the overlap region 520B using the selected low quality stitching operation.

FIG. 5C includes an image 500C and an image 502C sharing a common overlap region 520C. in the embodiment of FIG. 5C, the overlap region 520C is divided into four sub-blocks, region 514, region 515, region 516, and region 517. The priority of each sub-block is classified, for instance based on a highest priority classification of image features with each sub-block. For example, region 514 can be classified as "low priority", region 515 can be classified as "high priority", region 516 can be classified as "medium priority", and region 517 can be classified as "high priority". The stitch engine 245 subsequently selects a stitching operation for each sub-block based on the priority classification of each sub-block. For example, a low quality stitching operation is selected for region 514, a medium quality stitching operation is selected for region 516, and a high quality stitching operation is selected for regions 515 and 517. The stitching engine 245 then stitches together images 500C and 502C by applying each selected stitching operation to a corresponding sub-block. Continuing with the previous example, the low quality stitching operation is applied to the portions of the images 500C and 502C corresponding to the region 514, the high quality stitching operation is applied to the portions of the images 500C and 502C corresponding to the region 515, and so forth.

In some embodiments, the stitch engine 245 can select a stitching operation for each overlap region sub-block based on the priority associated with the convergence point as defined by an identified image feature. For example, a first stitching operation can be selected for a first image feature in a first overlap that defines a convergence point of a first priority, and a second stitching operation can be selected for a second image feature in a second overlap region that defines a convergence point of a second priority lower than the first priority, where the first stitching operation is a higher quality stitching operation than the second stitching operation.

Figure 6:
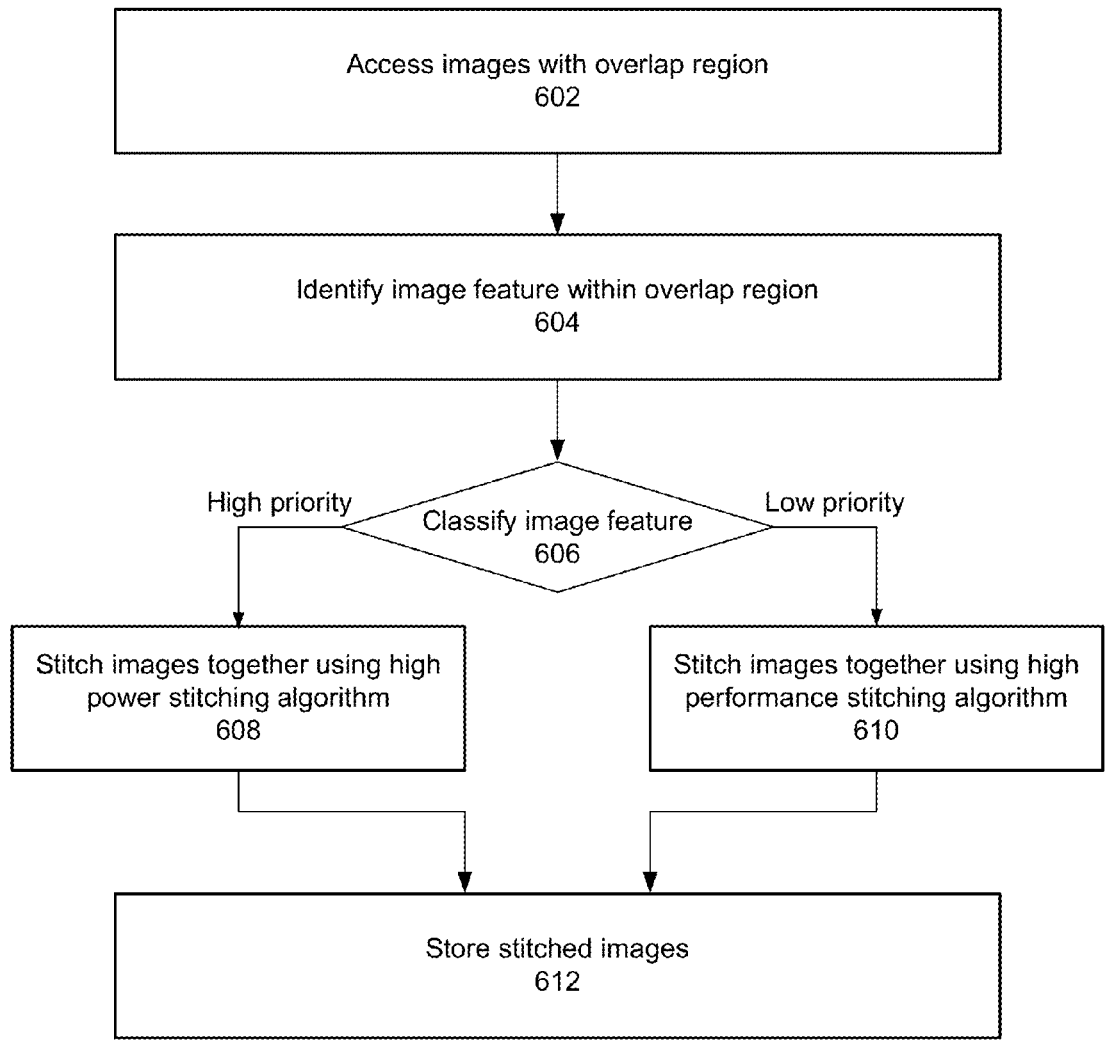
FIG. 6 is a flow chart illustrating a process for stitching images based on a classification of image features within an image overlap region, according to one embodiment.

FIG. 6 is a flow chart illustrating a process for stitching images based on a classification of image features within an image overlap region, according to one embodiment. Images associated with an overlap region are accessed 602. An image feature within the overlap region is identified 604. Examples of image features include human body parts, human faces, vehicles, objects, image lines, image textures, and the like.

The priority of the image feature is classified 606. In the embodiment of FIG. 6, two priority classifications are used:

high priority and low priority. A stitching operation is selected for the identified image feature based on the priority classification. If the image feature is classified as a high priority image feature, a high power stitching algorithm is selected, and the images are stitched 608 using the high power stitching algorithm. If the image feature is classified as a low priority image feature, a low power stitching algorithm is selected, and the images are stitched 610 using the low power stitching algorithm. The stitched images are then stored 612.

Image Stitching Based on Likelihood of Visible Artifacts

Likewise, the stitch engine 245 can analyze portions of images corresponding to an overlap region, and can determine that, for one or more image stitching operations, noticeable or visible image artifacts (such as visible stitching lines or seams, pixel blocks, chromatic aberrations, aliasing, image distortions, or any other artifacts) ("visible artifacts" hereinafter) are likely to result from the stitching operations based on properties of the images being stitched together. In response to such analysis, the stitch engine 245 can select one or more stitching operations based on a power or quality associated with the stitching operations, based on the determined likelihood that a particular stitching operation will result in visible artifacts, based on a pre-determined visible artifact threshold, or based on any other suitable criteria. In addition, the stitch engine 245 can perform one or more pre-processing operations on images corresponding to an overlap region based on this analysis before image stitching operations are performed.

The determined likelihood that stitching operations will produce visible artifacts can be numeric, for instance on a scale from 0% to 100%. Alternatively, the determined likelihood can be non-numeric, for instance "high", "medium", or "low". In some embodiments, the stitch engine 245 can access or is associated with one or more visible artifact thresholds. For example, the stitch engine 245 can store a first likelihood threshold corresponding to a 25% likelihood that a stitching operation will produce a visible artifact, a second likelihood threshold corresponding to a 50% likelihood that a stitching operation will produce a visible artifact, and so forth.

In some embodiments, the stitch engine 245 can access, store, or is associated with one or more visible artifact thresholds per iteration. For example, the stitch engine 245 can store a first iteration likelihood of 25% for a stitch algorithm to generate visible artifacts. However, given a previous frame's artifact measurement and degradation of image quality that is measured using a pre-existing metric, the likelihood estimation can modify the likelihood percentage of the stitch algorithm to (for example) 35% for the next frame. Continuing with this example, the 35% likelihood is then stored as the artifact threshold for a second iteration. This can be extended to adaptively modify and store one or more artifact thresholds depending the number of previous frames used to modify the artifact threshold for the current iteration.

The stitch engine 245 can determine the likelihood that image stitching operations are likely to produce visible artifacts in a number of ways. In some embodiments, the stitch engine 245 can determine the resolution of a portion of each of two or more images corresponding to an overlap region, for instance via the resolution detection module 255. The stitch engine 245 can determine a likelihood that a particular stitching operation will result in a visible artifact based on a disparity in the determined resolutions for two or more images to be stitched together. In one embodiment, the determined likelihood that a particular stitching operation will produce a visible artifact increases as the difference between a greatest resolution and a lowest resolution of two or more images being stitched together increases, and vice versa. Alternatively, the determined likelihood that a particular stitching operation will produce a visible artifact can decrease as the difference between a greatest resolution and a lowest resolution increases, and vice versa.

In some embodiments, the stitch engine 245 can determine the likelihood that image stitching operations are likely to produce visible artifacts based on the textures of each image in the two or more images to be stitched together. For instance, textures associated with high contrast and/or non-uniform chrominance or luminance distribution are more likely to cause stitching operations to produce visible artifacts than textures associated with low contrast and/or uniform chrominance or luminance distribution. The stitch engine 245 can determine the likelihood that image stitching operations are likely to produce visible artifacts based on a type of image feature within an overlap region. For instance, the stitch engine 245 can determine that a stitching operation is more likely to produce a visible artifact for images corresponding to an overlap region that includes a face, a human hand, a vehicle, or a straight edge than an overlap region that does not include such features.

The depth of image features in an overlap region can influence the likelihood that a particular stitching operation will produce a visible artifact. In some embodiments, for overlap regions including image features associated with a smaller depth (distance to one or more cameras), the stitch engine 245 can determine that a stitching operation is more likely to produce a visible artifact than for an overlap region that includes image features associated with a larger depth. In other words, the closer an image feature within an overlap region, the more likely a particular stitching operation will produce a visible artifact. In some embodiments, a first image feature can occlude a second image feature in a first image captured by a first camera, but may not occlude the second image feature in a second image captured by a second camera associated with a different line of sight than the first camera. In such embodiments, the stitch engine 245 can determine that a stitching operation is more likely to produce a visible artifact than embodiments where the first image feature occludes the second image feature in both the first and second images or in neither the first image nor the second image.

In some embodiments, the stitch engine 245 determines a likelihood that a stitching operation will produce a visible artifact when stitching together images based on a historical performance of the stitching operation. For example, if a stitching operation has resulted in a 20% rate of producing visible artifacts for previously stitched images, the stitch engine 245 can determine that the stitching operation is 20% likely to produce a visible artifact. In some embodiments, the stitch engine 245 can actually stitch together sub-portions of images associated with an overlap region (for instance, 16×16 pixel squares), and can determine a likelihood that the stitching operation used to stitch together the sub-potions of the images will produce visible artifacts based on the resulting stitched sub-portions of images. For example, if 3 out of 20 stitched sub-portions have visible artifacts, the stitch engine 245 can determine that the stitching operation is 15% likely to produce a visible artifact. In some additional embodiments, a database of a (pre-selected) number of sub-block overlap regions from the current frame and/or same/similar locations in previous frames in the video (multiple temporal frames) can be used to determine the likelihood estimate of the stitching operation to generate visible artifacts in that particular sub-block.

The stitch engine 245 can determine the likelihood that an image stitching operation will produce visible artifacts when stitching together images corresponding to an overlap region for each of a plurality of stitching operations. This plurality of stitching operations can include stitching operations associated with varying power and/or quality. In some embodiments, the resulting determined likelihoods will decrease as the quality or power of the corresponding stitching operations increases, but this is not necessarily the case. The stitch engine 245 can select a stitching operation for use in stitching together images based on the determined likelihoods. In some embodiments, the stitch engine 245 selects a stitching operation associated with the lowest likelihood of producing a visible artifact when stitching together the images associated with the overlap region. Alternatively, the stitch engine 245 can select a stitching operation associated with a likelihood of producing a visible artifact that is lower than an acceptable likelihood threshold. In some embodiments, the stitch engine 245 selects a lowest power stitching operation associated with a below-threshold likelihood of producing a visible artifact.

In some embodiments, in response to determining likelihoods that each of a set of stitching operations will produce visible artifacts if used to stitch together a set of images, the stitch engine 245 can perform one or more pre-processing operations on the set of images. For example, the stitch engine can downscale or upscale the resolution of one or more images in response to identifying a difference in resolution between two or more images. In some embodiments, the stitch engine 245 can access frames before and after the images in a sequence of frames to determine depth information for one or more image features within an overlap region corresponding to the images. In some embodiments, in response to determining the likelihood that one or more stitching operations will produce visible artifacts when stitching together images corresponding to an overlap region, the stitch engine 245 can smooth high-contrast portions of one or more of the images, or portions corresponding to non-uniform chrominance or luminance distribution. In some embodiments, the stitch engine 245 can perform such pre-processing operations in response to a determination that one or more of the determined likelihoods that one or more stitching operations will produce visible artifacts when stitching together images corresponding to an overlap region exceeds a pre-determined threshold. In some embodiments, after performing such pre-processing operations, the stitch engine 245 can re-determine or re-compute the likelihood that each of one or more stitching operations will produce visible artifacts when used to stitch together images corresponding to an overlap region.

Figure 7:
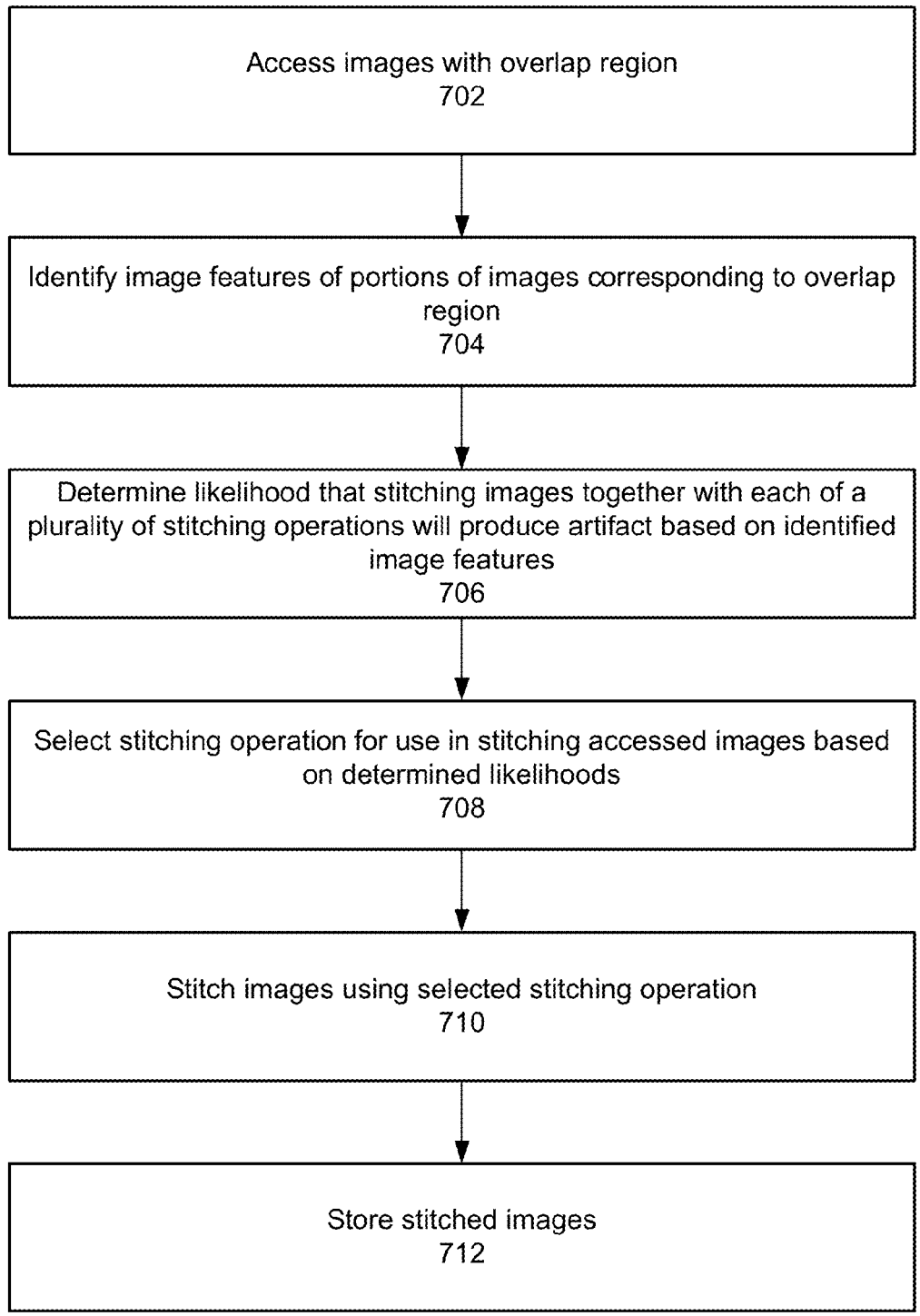
FIG. 7 is a flowchart illustrating a process for stitching images based on a determined likelihood of stitching artifacts, according to one embodiment.

FIG. 7 is a flowchart illustrating a process for stitching images based on a determined likelihood of stitching artifacts, according to one embodiment. A set of images corresponding to an overlap region are accessed 702. Image features within portions of the accessed images corresponding to the overlap region are identified 704. Examples of image features include image resolutions, textures, faces, objects, vehicles, edges, and the like.

The likelihood that stitching images together will produce a visible artifact is determined 706 for each of a plurality of stitching operations based on the identified image features. A stitching operation is selected 708 based on the determined likelihoods associated with the stitching operations. For example, the stitching operation associated with a lowest likelihood of producing visible artifacts is selected, or the lowest power or lowest quality stitching operation associated with a below-threshold likelihood of producing visible artifacts. The accessed images are stitched 710 using the selected stitching operation, and the stitches images are stored 712.

Image Stitching Based on Image Feature Depth

The stitching operations used to stitch two or more overlapping images together can be selected based on a depth of an image feature within an overlap region. For instance, the stitch engine 245 can select an image stitching operation based on a determined depth of a face detected in the overlap region, such as a high quality stitching operation if the detected face is closer to the camera array used to capture the images being stitched together than a pre-determined depth threshold, or a low quality stitching operation if the detected face is farther away from the camera array than the pre-determined depth threshold and vice versa. The selection of a stitching operation based on the determined depth of image features detected in the overlap region can be based on a convergence point defined by (for example) a user, an image feature, and the like.

The stitch engine 245 can identify image features within an overlap region associated with a set of images to be stitched together in a number of ways, as described herein. For instance, the stitch engine 245 can identify overlap region image features using the feature detection module 250. In some embodiments, the stitch engine 245 can further identify a feature type of each detected image feature, such as a face, an object, a vehicle, a human, an edge, a texture, and the like.

The stitch engine 245 can determine the depth of each identified image feature. In some embodiments, the stitch engine 245 can determine image feature depths using the depth detection module 260. For example, the depth detection module 260 can determine image feature depths using parallax information. In some embodiments, the stitch engine 245 can determine the percentage of field of view of one or more cameras corresponding to an overlap region containing an identified image feature. In response, the depth detection module 260 can access, based on a type of the identified image feature, a table mapping field of view percentages corresponding to the pre-determined dimension ranges for the image feature type to depths, and can query the table using the determined field of view percentage to determine the depth of the image feature.

In response to determining the depth of one or more image features within an overlap region, the stitch engine 245 can select a stitching operation for use in stitching images corresponding to the overlap region. The stitch engine 245 can select a stitching operation based on the depth of the closest detected image feature in the overlap region, based on the depth of the furthest detected image feature in the overlap region, based on an average depths of image features in the detected overlap region, based on the depth of image features of a particular type (such as faces), or based on any other suitable measurement of depth.

In some embodiments, the stitch engine 245 can select a stitching operation based on the depth of a highest lens-resolvable image feature. This depth is dependent on lens parameters such as f/# and the optical spot size variation of the detected features. Based on the spatial location of these features, they can be further classified into variable shape objects having different depths or pre-determined regions and sub-regions (sub-blocks) having different depths. Accordingly, a stitching operation can be selected based on the resolvable limits of the lens.

In some embodiments, the quality or power of the selected stitching operation increases as a determined depth of a detected image feature decreases, and vice versa. For example, a first stitching operation corresponding to a first quality can be selected for a first image feature at a first depth, while a second stitching operation corresponding to a second quality greater than the first quality can be selected for a second image feature at a second depth closer than the first depth. In some embodiments, a first stitching operation can be selected if a detected image feature is located at a depth smaller than a depth threshold, while a second, lower-quality operation can be selected if the detected image feature is located at a depth greater than the depth threshold.

In some embodiments, the stitch engine 245 divides the overlap region into image sub-blocks, identifies an image feature and a corresponding image feature depth within each sub-block, and selects a stitching operation for each sub-block. For example, if a first image feature located at a first depth is identified in a first overlap region sub-block, and a second image feature located at a second depth greater than the first depth is identified in a second overlap region sub-block, a first stitching operation associated with a first quality can be selected for the first sub-block, and a second stitching operation associated with a second quality lower than the first quality can be selected for the second sub-block. In such embodiments, the portions of the images corresponding to each overlap region sub-block are stitched together using the corresponding stitching operation selected for each sub-block.

It should be noted that in some embodiments, if a particular face or hand or any other content dependent image feature is extremely close to the camera during video capture, a low quality image stitching can be selected. Additionally, if the image feature contains objects that are more than a threshold distance away, the image features can be classified as "background", and a low quality stitching operation can be selected.

Figure 8A:
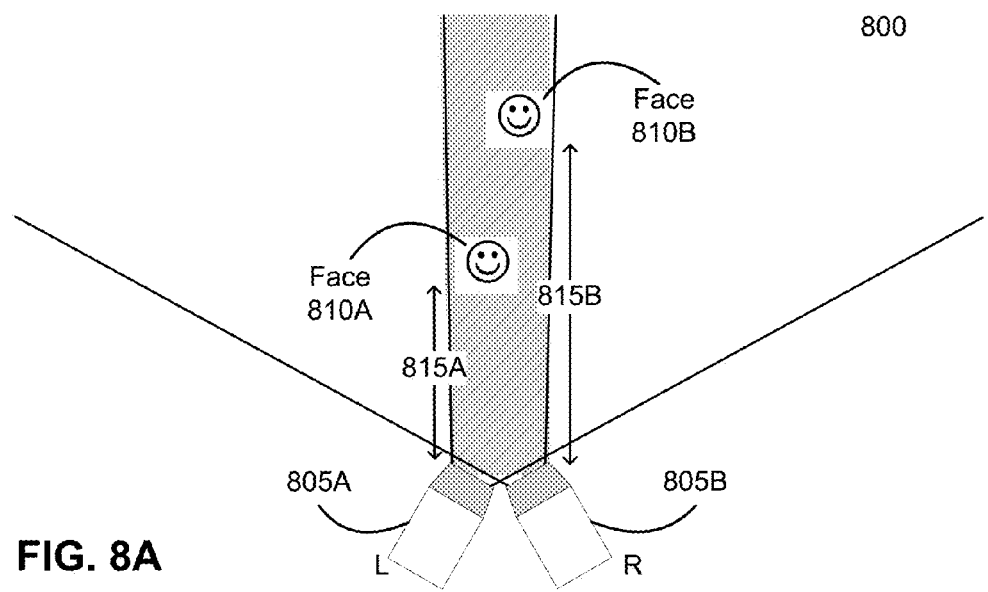
FIGS. 8A-8B illustrate depth-based image stitching for image captured by a multi-camera array, according to one embodiment.
Figure 8B:
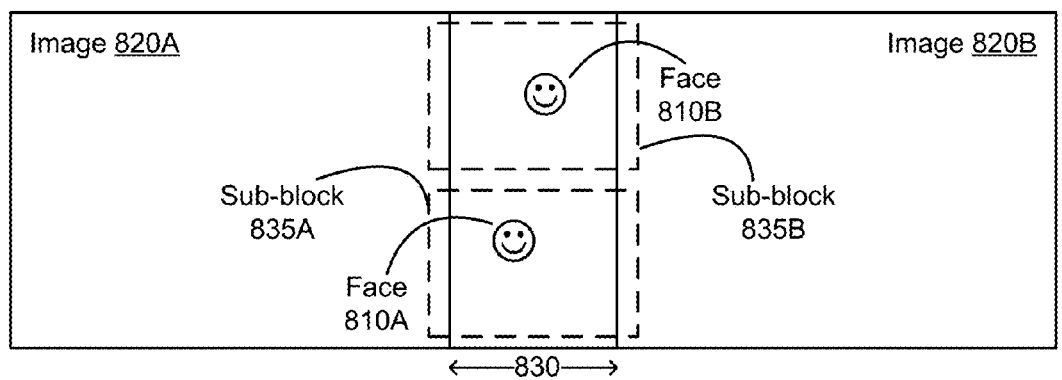

FIGS. 8A-8B illustrate depth-based image stitching for image captured by a multi-camera array, according to one embodiment. In the embodiment 800 of FIGS. 8A and 8B, a left camera 805A captures image 820B, and a right camera 805B captures image 820A. The images 820A and 820B include an overlap region 830 that includes two detected image features: a face 810A located at a depth 815A, and a face 810B located at a depth 815B greater than the depth 815A.

The overlap region 830 is divided into two sub-blocks: sub-block 835A, which includes the face 810A, and sub-block 810B, which includes the face 810B. A first stitching operation is selected for the sub-block 835A, and a second stitching operation is selected for the sub-block 835B. The first stitching operation is selected based on the determined depth 815A, and the second stitching operation is selected based on the determined depth 815B. The images 820A and 820B are then stitched together using the selected stitching operations, for instance by stitching together the portions of images 820A and 820B corresponding to the sub-block 835A using the first stitching operation, and by stitching together the portions of images 820A and 820B corresponding to the sub-block 835B using the second stitching operation.

Figure 9:
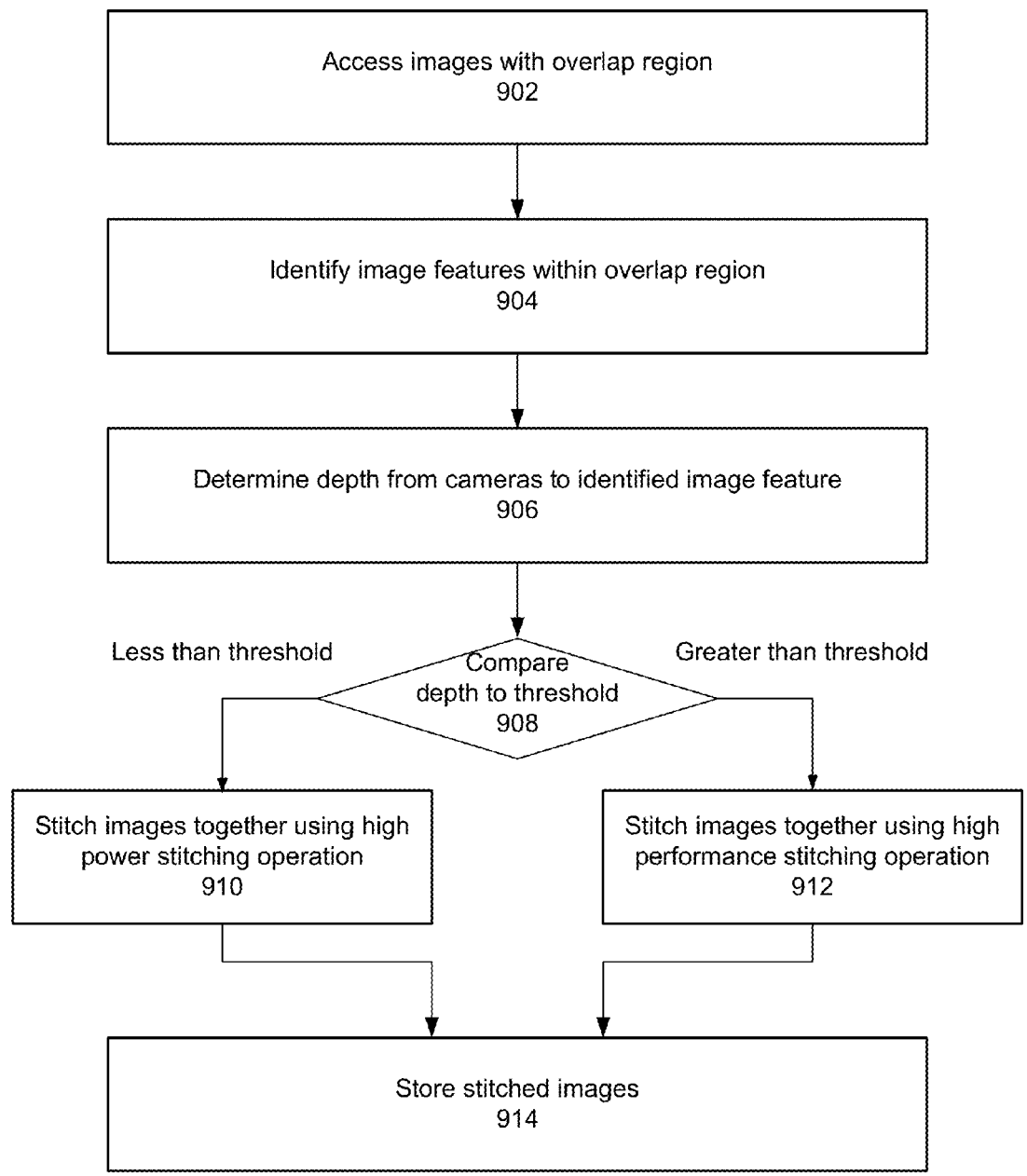
FIG. 9 is a flowchart illustrating a process for stitching images based on a determined depth of an image feature, according to one embodiment.

FIG. 9 is a flowchart illustrating a process for stitching images based on a determined depth of an image feature, according to one embodiment. A set of images corresponding to an overlap region is accessed 902. One or more image features within the overlap region are identified 904. Examples of image features include faces, textures, objects, vehicles, edges, body parts, and the like.

A depth from a set of cameras that captured the accessed images to an identified image feature is determined 906. In some embodiments, the determined depth is the distance from the cameras to the closest identified image feature, while in other embodiments, the determined depth is the distance from the cameras to the further identified image feature or the average depth of each identified image feature. The determined depth is compared 908 to a predetermined depth threshold. In response to the determined depth being less than the depth threshold, the images are stitched 910 using a high power stitching algorithm. In response to the determined depth being greater than the depth threshold, the images are stitched 912 using a high performance (or low power) stitching operation. It should be noted that in some embodiments, the stitching operation used to stitch the images is selected based on the determined depth itself, without comparison to a depth threshold. The stitching images are then stored 914.

In some implementation embodiments, all stitching operations can be run simultaneously using a multi-threaded system architecture for each depth, image feature, region, sub-region (sub-block), likelihood percentage, predicted view position, and the like. Once the regions and sub-regions are categorized and the quality/performance of the stitch method is identified and selected (either statically or dynamically), all stitching operations can be performed in parallel such that the stitching for the entire image or video frame with varying quality of stitches on varying depths and regions/sub-regions with varying power constraints takes place in one image stitching pass.

ADDITIONAL CONFIGURATION CONSIDERATIONS

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for stitching images, comprising:
accessing a set of images associated with an overlap region for display to a user, the overlap region comprising a corresponding portion of each of the set of images;
identifying one or more image features within the overlap region;
assigning a priority to each image feature;
dividing the overlap region into sub-blocks;
selecting, for each sub-block, one or more stitching operations based on the priorities assigned to the image features within the sub-block;
digitally stitching, by a hardware image processor, the set of images together to produce a stitched image using the selected stitching operations; and
storing the stitched image.

2. The method of claim 1, wherein the set of images comprises images captured by a multi-camera array, each image in the set of images captured by a different camera in the multi-camera array.

3. The method of claim 1, wherein assigning a priority to an image feature comprises assigning a priority based on a type of the image feature.

4. The method of claim 1, wherein a quality of a selected stitching operation is proportional to a priority of a highest priority image feature.

5. The method of claim 1, wherein selecting a stitching operation for a sub-block comprises selecting a stitching operation based on a highest priority image feature within the sub-block.

6. The method of claim 1, wherein stitching the set of images together comprises, for each sub-block, stitching a portion of each of the set of images together using the stitching operation selected for the sub-block.

7. A system for stitching images, comprising:
an input configured to access a set of images associated with an overlap region for display to a user, the overlap region comprising a corresponding portion of each of the set of images;
an image processing system comprising at least one hardware image processor, the image processing system configured to:
identify one or more image features within the overlap region;
assign a priority to each image feature;
divide the overlap region into sub-blocks;
select, for each sub-block, one or more stitching operations based on the priorities assigned to the image features within the sub-block; and
digitally stitch, by the hardware image processor, the set of images together to produce a stitched image using the selected stitching operations; and
a non-transitory computer-readable storage medium configured to store the stitched image.

8. The system of claim 7, wherein the set of images comprises images captured by a multi-camera array, each image in the set of images captured by a different camera in the multi-camera array.

9. The system of claim 7, wherein assigning a priority to an image feature comprises assigning a priority based on a type of the image feature.

10. The system of claim 7, wherein a quality of a selected stitching operation is proportional to a priority of a highest priority image feature.

11. The system of claim 7, wherein selecting a stitching operation for a sub-block comprises selecting a stitching operation based on a highest priority image feature within the sub-block.

12. The system of claim 7, wherein stitching the set of images together comprises, for each sub-block, stitching a portion of each of the set of images together using the stitching operation selected for the sub-block.

13. A non-transitory computer-readable storage medium storing executable computer instructions for stitching images, the instructions configured to, when executed by a processor, perform steps comprising:
accessing a set of images associated with an overlap region for display to a user, the overlap region comprising a corresponding portion of each of the set of images;
identifying one or more image features within the overlap region;
assigning a priority to each image feature;
dividing the overlap region into sub-blocks;
selecting, for each sub-block, one or more stitching operations based on the priorities assigned to the image features within the sub-block;
digitally stitching, by a hardware image processor, the set of images together to produce a stitched image using the selected stitching operations; and
storing the stitched image.

14. The computer-readable storage medium of claim 13, wherein the set of images comprises images captured by a multi-camera array, each image in the set of images captured by a different camera in the multi-camera array.

15. The computer-readable storage medium of claim 13, wherein assigning a priority to an image feature comprises assigning a priority based on a type of the image feature.

16. The computer-readable storage medium of claim 13, wherein a quality of a selected stitching operation is proportional to a priority of a highest priority image feature.

17. The computer-readable storage medium of claim 13, wherein selecting a stitching operation for a sub-block comprises selecting a stitching operation based on a highest priority image feature within the sub-block.

18. The computer-readable storage medium of claim 13, wherein stitching the set of images together comprises, for each sub-block, stitching a portion of each of the set of images together using the stitching operation selected for the sub-block.

* * * * *